United States Patent [19]

Barbolla

[11] Patent Number: 5,263,101
[45] Date of Patent: Nov. 16, 1993

[54] OPTICAL SCANNER FILTER SCREEN

[75] Inventor: Barbara M. Barbolla, Ft. Worth, Tex.

[73] Assignee: Tandy Corporation, Ft. Worth, Tex.

[21] Appl. No.: 549,865

[22] Filed: Jul. 9, 1990

[51] Int. Cl.$^5$ .............. G06K 9/20; G06K 7/00; G03B 27/72; G03B 7/099

[52] U.S. Cl. ...................... 382/58; 382/65; 355/71; 354/482; 359/614

[58] Field of Search .......... 382/65, 58, 66, 67, 382/68; 355/71; 350/311, 318, 316; 354/482, 483; 378/156; 356/402; 359/885, 892, 614; 250/222.1, 234.6, 208.1

[56] References Cited

U.S. PATENT DOCUMENTS

| | | | |
|---|---|---|---|
| 3,123,804 | 3/1964 | Kamentsky | 382/61 |
| 3,395,284 | 7/1968 | Smith | 382/65 |
| 3,976,875 | 8/1976 | Engstrom et al. | 350/311 |
| 4,416,530 | 11/1983 | Herbert et al. | 355/71 |
| 4,771,473 | 9/1988 | Sugiura | 358/451 |
| 4,802,745 | 2/1989 | Okada et al. | 350/398 |
| 4,803,737 | 2/1989 | Sato et al. | 382/65 |
| 4,822,147 | 4/1989 | Park | 350/397 |

OTHER PUBLICATIONS

Oriel Corporation "Optics and Filters Catalogue vol. III" pp. 2-2→2-4.
Wilson, "Optical Page Reading Devices", Reinhold Publishing Corporation, (1966), pp. ix, and 47–50.
Chartpak advertisement.
Nemzow, *Ventura Professional!*(May 1990) pp. 20–26.
Beale et al., *Ventura Professional!*(May 1990) pp. 10–17.
Beale et al., *The Scanner Book*, Micro Publishing Press, Torrance, Calif., 1989, pp. 22–24.
Wilson, *Optical Page Reading Devices*, Reinhold Publishing Co., London, England, 196, p. 49.
Roth et al., *Scanjet Unlimited*, Peachpit Press Publishers, Berkeley, Calif., 1990, Chapter 1, pp. 1–24; Chapter 2, pp. 25–36; and Chapter 4, pp. 47–75.
Holsinger et al., *Publish!*(Mar. 1990) pp. 56–64.
Mendelson, *PC Magazine* (Dec. 26, 1989) p. 44.

*Primary Examiner*—David K. Moore
*Assistant Examiner*—Michael Cammarata
*Attorney, Agent, or Firm*—Townsend and Townsend Khourie and Crew

[57] ABSTRACT

An optical scanner filter screen for use with an optical scanner, and method for use, comprising a colored optical filter or optical glass placed between the scanning mechanism of the optical scanner and the document to be scanned, for improving the accuracy of the reproduction of the document resulting from the optical scan by increasing contrast and reducing reflection and distortion of the light read by the scanning mechanism.

3 Claims, 15 Drawing Sheets

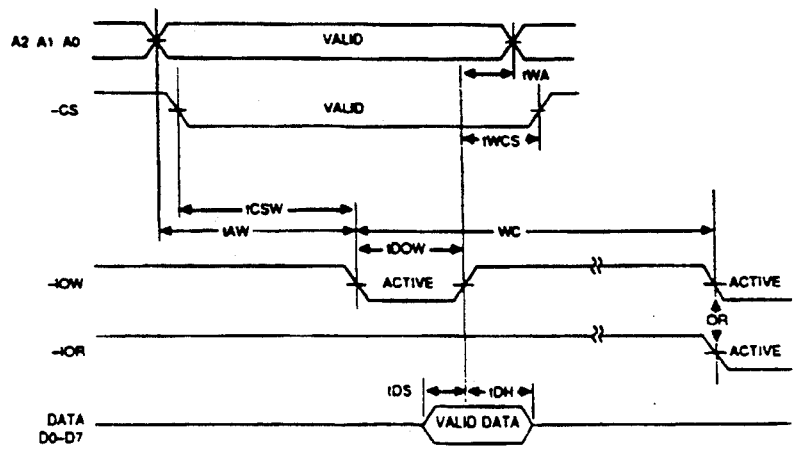
Write Cycle Timing
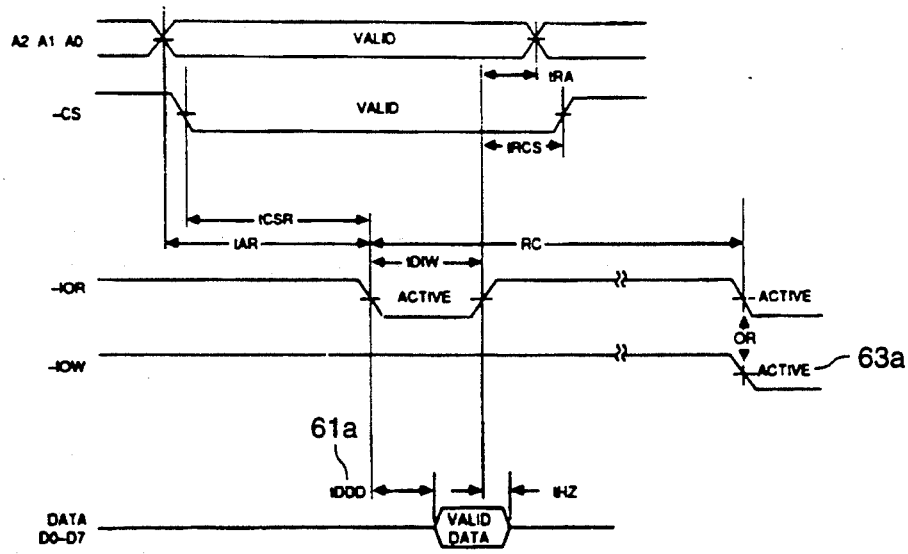
Read Cycle Timing
*FIG. 5a*

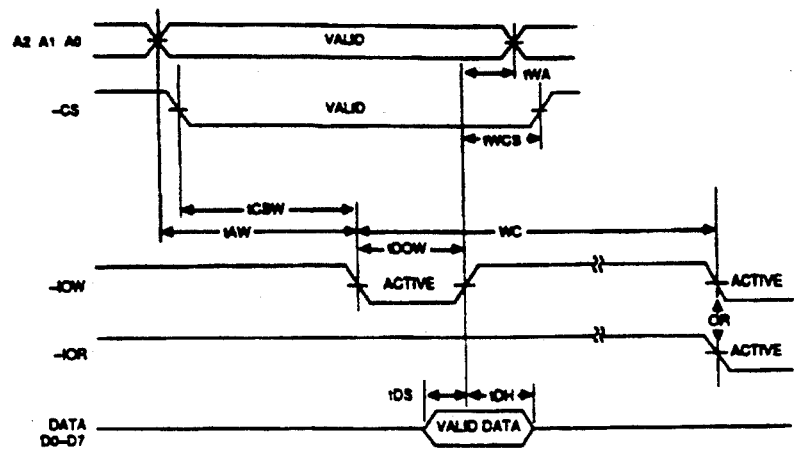
Write Cycle Timing
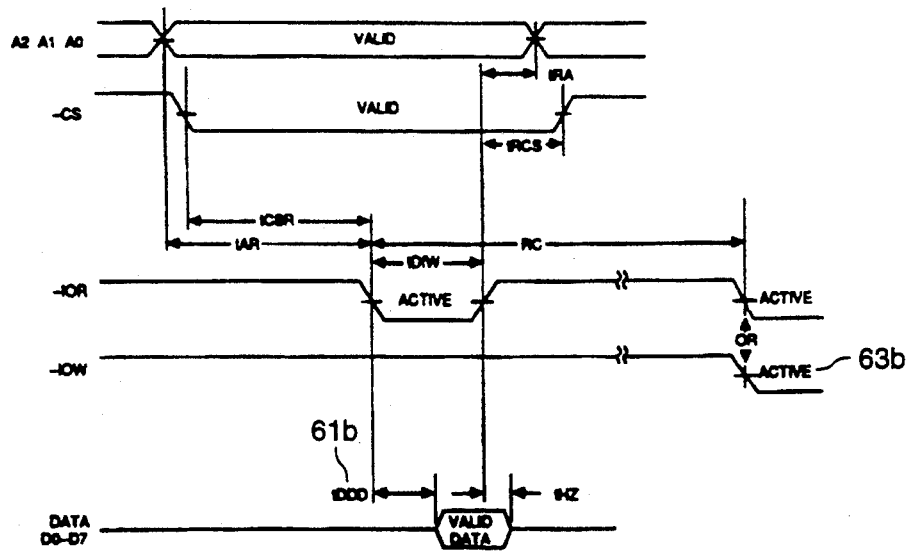
Read Cycle Timing
*FIG. 5b*

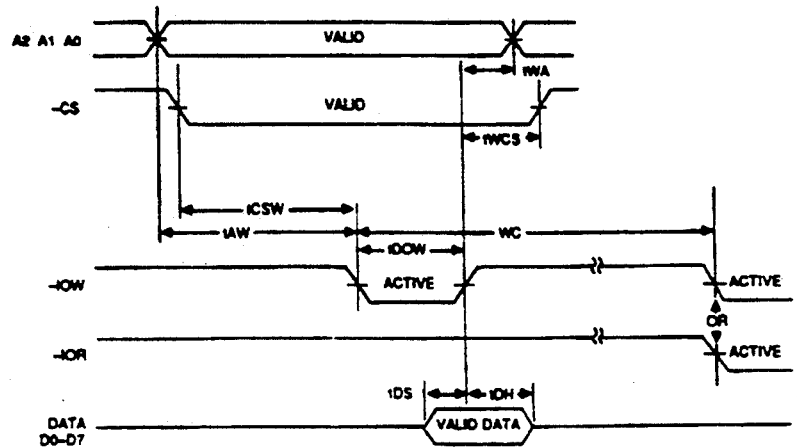
Write Cycle Timing
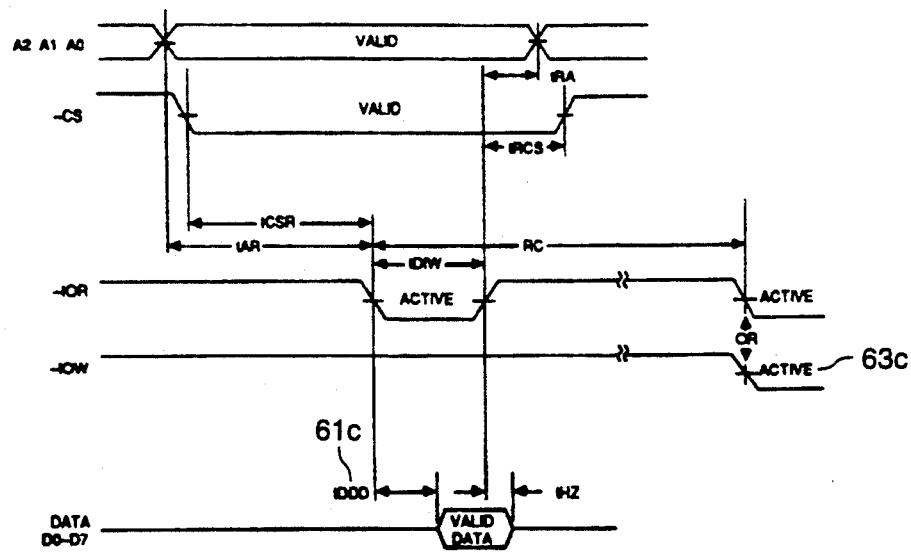
Read Cycle Timing
*FIG. 5c*

CHIPS

82C301 AC Characteristics (Continued) 71a
($T_A$ = 0°C to 70°C, $V_{CC}$ = 5V ± 5%)

| Sym | Description 73a | 82C301-16 Min | 82C301-16 Typ | 82C301-16 Max | 82C301-20 Min | 82C301-20 Typ | 82C301-20 Max | Unit | Notes |
|---|---|---|---|---|---|---|---|---|---|
| t149 | OWS hold time from ATSCLK | 0 | | | 0 | | | ns | |
| t151 | NMICS setup time to XIOW active | 20 | | | 20 | | | ns | |
| t152 | NMICS hold time from XIOW inactive | 20 | | | 20 | | | ns | |
| t153 | Data (XD7) set-up time to XIOW inactive | 30 | | | 30 | | | ns | |
| t154 | Data (XD7) hold time from XIOW inactive | 20 | | | 20 | | | ns | |
| t155 | NMI delay from XIOW inactive | | 25 | | | 25 | | ns | |
| t156 | PORTBCS set-up to XIOR, XIOW active | 20 | | | 20 | | | ns | |
| t157 | PORTBCS hold time from XIOR, XIOW inactive | 20 | | | 20 | | | ns | |
| t158 | Data (XD<7:0>) valid delay from XIOR active | 15 | | | 15 | | | ns | |
| t159 | Data (XD<7:0>) hold time from XIOR inactive | 15 | | | 15 | | | ns | |
| t160 | IO2XCS set-up time to XIOR, XIOW active | | 10 | | | 10 | | ns | |
| t161 | IO2XCS hold time from XIOR, XIOW inactive | | 15 | | | 15 | | ns | |
| t162 | LPAR, IOCHK, PFAIL pulse width | | 15 | | | 15 | | ns | |
| t165 | REFREQ pulse width | 15 | | | 15 | | | ns | |
| t166 | REF set-up time to ATSCLK | | 10 | | | 10 | | ns | |
| t167 | XMEMR active delay (refresh cycle) from ATSCLK | | 15 | | | 15 | | ns | |
| t168 | XMEMR inactive delay (refresh cycle) from ATSCLK | | 15 | | | 15 | | ns | |
| t169 | IOCHRDY set-up time (refresh cycle) from ATSCLK | 25 | | | 25 | | | ns | |
| t170 | IOCHRDY hold time (refresh cycle) from ATSCLK | 0 | | | 0 | | | ns | |
| t171 | BE<3:0> active delay from XA0, XA1, XBHE valid | | 15 | | | 15 | | ns | |
| t172 | BE<3:0> inactive delay | | 15 | | | 15 | | ns | |

Test Load = 65pF unless otherwise specified.

*FIG. 7a*

CHIPS

82C301 AC Characteristics (Continued) 71b
($T_A$ = 0°C to 70°C, $V_{CC}$ = 5V ± 5%)

| Sym | Description 73b | 82C301-16 Min | 82C301-16 Typ | 82C301-16 Max | 82C301-20 Min | 82C301-20 Typ | 82C301-20 Max | Unit | Notes |
|---|---|---|---|---|---|---|---|---|---|
| t149 | OWS hold time from ATSCLK | 0 | | | 0 | | | ns | |
| t151 | NMICS setup time to XIOW active | 20 | | | 20 | | | ns | |
| t152 | NMICS hold time from XIOW inactive | 20 | | | 20 | | | ns | |
| t153 | Data (XD7) set-up time to XIOW inactive | 30 | | | 30 | | | ns | |
| t154 | Data (XD7) hold time from XIOW inactive | 20 | | | 20 | | | ns | |
| t155 | NMI delay from XIOW inactive | | 25 | | | 25 | | ns | |
| t156 | PORTBCS set-up to XIOR, XIOW active | 20 | | | 20 | | | ns | |
| t157 | PORTBCS hold time from XIOR, XIOW inactive | 20 | | | 20 | | | ns | |
| t158 | Data (XD<7:0>) valid delay from XIOR active | 15 | | | 15 | | | ns | |
| t159 | Data (XD<7:0>) hold time from XIOR inactive | 15 | | | 15 | | | ns | |
| t160 | IO2XCS set-up time to XIOR, XIOW active | | 10 | | | 10 | | ns | |
| t161 | IO2XCS hold time from XIOR, XIOW inactive | | 15 | | | 15 | | ns | |
| t162 | LPAR, IOCHK, PFAIL pulse width | | 15 | | | 15 | | ns | |
| t165 | REFREQ pulse width | 15 | | | 15 | | | ns | |
| t166 | REF set-up time to ATSCLK | | 10 | | | 10 | | ns | |
| t167 | XMEMR active delay (refresh cycle) from ATSCLK | | 15 | | | 15 | | ns | |
| t168 | XMEMR inactive delay (refresh cycle) from ATSCLK | | 15 | | | 15 | | ns | |
| t169 | IOCHRDY set-up time (refresh cycle) from ATSCLK | 25 | | | 25 | | | ns | |
| t170 | IOCHRDY hold time (refresh cycle) from ATSCLK | 0 | | | 0 | | | ns | |
| t171 | BE<3:0> active delay from XA0, XA1, XBHE valid | | 15 | | | 15 | | ns | |
| t172 | BE<3:0> inactive delay | | 15 | | | 15 | | ns | |

Test Load = 65pF unless otherwise specified.

*FIG. 7b*

This is a demonstration to show how a yellow filter improves a scanned image. Specifically, this demonstration shows the improvement a yellow filter makes when using Optical Character Recognition (OCR) software.

OCR software reads each individual character in a document and compares it to its own set of internal fonts. If a match is made, the software accurately duplicates the character. If not, the software uses a similar-looking character instead.
Often a the letter "a" is represented by the symbol "@," or a number "1" replaced with a lower-case "l."

Until recently, OCR software could only read standard typewriter fonts and even then the accuracy rate was poor. Now some OCR manufacturers claim a 99% accuracy rate with their OCR software, but it is usually very expensive, often costing more than the scanner itself.

By cutting excess glare and making the black characters more distinctive, using a yellow filter improves the accuracy of the OCR scanning capability. The software gets a more accurate reading of each character and as a result, can more accurately reproduce that same character. In most tests, the yellow filter cut the error rate by over half.

! @ # $ % ^ & * ( ) _ +

1 2 3 4 5 6 7 8 9 0 - =

ABCDEFGHIJKLMNOPQRSTUVWXYZ abcdefghijklmnopqrstuvwxyz

*FIG. 10a*

This is a demonstration to show how a yellow filter improves
a scanned image. Specifically, this deMbestration shoes the
iMproveMent a yellvw filter Mike@ @hER US1513 Optical
Character Rec@griti=@ (OCR; s@ftware.

OCR software reads each individual character in a document
and compares it to its own set of internal fonts. If a match
is made, the software accurately duplicates the character.
If not, the software uses a similar-looking character instead.
Often a the letter "a" is represented by the symbol "@," or
a number "1" replaced with a lower-case "l."

Until recently, OCR software could only read standard
typewriter fonts and even then the accuracy rate was poor.
Now some OCR manufacturers claim a 99% accuracy rate with
their OCR software, but it is usually very expensive, often
costing more than the scanner itself.

By cutting excess glare and making the black characters more
distinctive, using a yellow filter improves the accuracy of
the OCR scanning capability. The software gets a more
accurate reading of each character and as a result, can more
accurately reproduce that same character. In most tests, the
yellow filter cut the error rate by over half.

! @ $ % . & * ( ) -- +

1 2 3 4 5 6 7 8 9 0 - @

ABCDEFGHIJKLMNOPQRSTUfmfxYz abcdefghijklmnopqrstuvwxyz

*FIG. 10b*

This is a demonstration to show how a yellow filter improves
a scanned image. Specifically, this demonstration sho₤s the
improvement a yellow filter m=kes ₤hen using Optical
Character Recognition (OCR) soft₤are.

OCR software reads each individual character in a document
and compares it to its own set of internal fonts. If a match
is made, the software accurately duplicates the character.
If not, the software uses a similar-looking character instead.
Often a the letter "a" is represented by the symbol "₤," or
a number "1" replaced with a lower-case "l."

Until recently, OCR software could only read standard
typewriter fonts and even then the accuracy rate was poor.
Now some OCR manufacturers claim a 99% accuracy rate with
their OCR software, but it is usually very expensive, often
costing more than the scanner itself.

By cutting excess glare and making the black characters more
distinctive, using a yellow filter improves the accuracy of
the OCR scanning capability. The software gets a more
accurate reading of each character and as a result, can more
accurately reproduce that same character. In most tests, the
yellow filter cut the error rate by over half.

! @ $ % - & * ( ) -- +

1 2 3 4 5 6 7 8 9 0 - =

ABCDEFGHIJKLMNOPQRSTUVWXYZ abcdefghij₤lmnopqrstuvwxyz

*FIG. 10c*

OPTICAL SCANNER FILTER SCREEN

BACKGROUND OF THE INVENTION

The present invention relates to the field of optical scanners. More specifically, in one embodiment the invention provides a method and apparatus for improving the quality of images resulting from the optical scan of a document, and, more particularly, a method and apparatus for increasing the contrast of a document to be scanned either for optical image reproduction or for optical character recognition, using an optical filter screen placed between the scanning mechanism and the document to be scanned.

An optical scanner is a well-known device that uses a light source and a system of reflective mirrors and light sensors to read an image contained on an original document, then convert that image to electrical signals that a computer can interpret. Optical scanners have two primary uses: for reproducing text and for reproducing graphics.

Scanning graphics and text dramatically reduces printing costs and reproduction time. On an average, by-hand paste-ups may cost up to 50 times as much as computer graphics. However, certain drawbacks exist when using a scanner. Image quality is not always sharp, especially if the document or artwork has very fine lines or type. When scanned, these lines often appear to have an uneven consistency or "choppy" effect. Further, the recognition of alpha-numeric characters is limited by the ability of an optical scanner to distinguish between the character forms on the document and the blank background of the document. This becomes a problem where the characters are printed lightly on the page, or where the edges of the characters are vague or fuzzy.

One attempted solution to these problems has been the use of high-resolution scanners. High-resolution scanners are better capable than low- or moderate-resolution scanners of detecting small areas, and of resolving areas of gray into details. Further, high-resolution scanners are less likely to be "fooled" into taking image imperfections in the original document as part of the image itself, thus improving the accuracy of the scan. However, this solution is a slow or sometimes highly costly one, and is not available to the owner of a low- or moderate- resolution scanner, short of changing hardware altogether.

A second solution is the use of image-manipulation programs (software) to improve image quality. However, image-manipulation programs tend to be expensive and time-consuming. Manipulation of a scanned image using software may also result in distortion of the patterns of dots forming the image, creating a wave or circular "moire" pattern in the resulting image. Further, most scanning software manipulates or enhances an image after it has been scanned. Reading in a low quality image gives the image-manipulation software a less-than-optimum image to work with. It is much better if the scanned image is the highest quality it can be while it is being scanned.

A third attempted solution is to change the light source to reduce the amount of excess light in the scanner. The most common source of light in a scanner is a quartz halide lamp. Quartz halide provides a very intense white light, and produces truer "whites" and better contrast than other sources of light. However, quartz halide also emits a great amount of excess reflected and refracted light, causing inaccurate scans. It has been tried to substitute fluorescent light for the quartz halide source, which provides a less intense, "softer" illumination, reducing the amount of excess refracted light. However, the fluorescent light has a bluish-green cast that significantly reduces contrast between dark and light areas and brings the whites and blacks down to more moderate levels of gray tones. Thus, attempts to modify the light source to provide for high contrast in addition to an acceptably low level of excess light, have not produced satisfactory results.

Thus, while prior art systems for improving the quality of scanned images have met with some success, problems remain. Accordingly, it is seen that a method and apparatus for improving the accuracy of reproduction of a scanned image at the time of scanning by increasing contrast and decreasing the amount of excess light, and without increasing the resolution of the optical scanner, is desired.

It has been known in photography that certain enhancements in black and white images may be obtained with different-colored filters attached to a camera lens.

SUMMARY OF THE INVENTION

An improved method and apparatus for improving the accuracy of the reproduction of an image using an optical scanner, comprising placement of an optical scanner filter screen between the image to be read and the scanning mechanism of the scanner, is disclosed. In one embodiment, the optical scanner filter screen is a colored, preferentially a yellow or amber, screen, preferentially a colored film such as mylar film. In some embodiments, the optical scanner filter screen is adhered to the under-side of the optical glass of an optical scanner, away from the side of the glass on which the document to be scanned is placed, and between the optical glass and the scanning mechanism. In additional embodiments, the optical glass itself is colored to serve as the filter.

In some embodiments the optical scanner filter screen is used in conjunction with optical scanners for improved graphic reproduction of an image on a document, the image being graphics, or text, or a combination. In alternative embodiments, the optical scanner filter screen is used in conjunction with a optical character readers to reduce the error in character recognition of textual documents containing alpha-numeric characters to be read as discrete characters, rather than as graphic images, into a computer.

Lack of contrast can result in an inaccurate image being recorded. Contrast is enhanced by reducing the amount of excess reflected light (glare) and also by manipulating certain colors in the light spectrum. This is done in the present invention by using a color filter to manipulate the light. Use of a colored screen cuts down on the amount of reflected light so that the scanner mechanism records a more concise and accurate image. Fine lines and type are crisper and easier to read. A filter such as a yellow filter is especially useful to enhance dark images by making them appear "blacker", and to bring out more detail in lighter images. The filter helps cut out the "glare", to allow the scanner to get a more accurate reading of the image.

The addition of a colored filter screen to an optical scanner is a very inexpensive improvement in relation to the increased quality of the scanned image. The cost is far less than the cost of a replacement high-resolution machine or of improved software.

Accordingly, in one embodiment the invention comprises an optical scanner having a light source, a scanning mechanism for sensing patterns of light from the light source reflected off the document to be scanned, an optically transparent glass for holding the document during scanning, a cover for holding the document to the glass opposite the scanning mechanism and a processor for converting the pattern of reflected light sensed by the scanning mechanism into digital information, and a colored filter screen placed between the glass and the scanning mechanism, for manipulating the light directed toward and reflected from the document to be scanned.

In an alternative embodiment the invention includes illuminating means, scanning means for detecting light reflected from a document to be scanned, and a filter screen placed between the scanning mechanism and the document to reduce the amount of reflected light reaching the scanning mechanism.

In another embodiment the invention includes a filter screen which comprises a colored optical glass used in place of the clear optical glass of an optical scanner.

In yet another embodiment, the invention contemplates a method for scanning a document, including the steps of selecting a document to be scanned, illuminating the document, reducing the amount of light of selected wavelengths reflected from the document with an optical filter, sensing the pattern of reduced reflected light using a scanning mechanism, and converting the sensed patterns of reflected light into computerized information.

A further embodiment of the invention contemplates a method of modifying an optical scanner having a scanning mechanism, to improve the accuracy of scanning of documents, including the step of placing a colored optical filter between the document to be scanned and the scanning mechanism of the optical scanner.

A further understanding of the nature and advantages of the inventions herein may be realized by reference to the remaining portions of the specification and the attached drawings.

BRIEF DESCRIPTION OF THE DRAWINGS

FIGS. 4-7 show results, without and with a filter screen, of a line scan.

FIG. 10 shows results, without and with a filter screen, of an optical character recognition scan.

DESCRIPTION OF THE PREFERRED EMBODIMENTS

Figure 1:
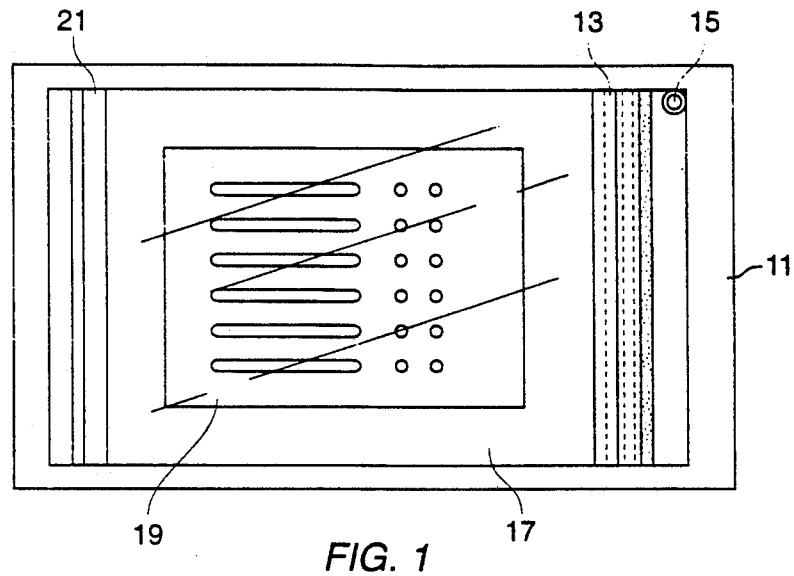
FIG. 1 is a schematic top view of a typical optical scanner.

FIG. 1 is a top-view schematic diagram illustrating a typical flat-bed optical scanner. A typical optical scanner generally comprises a housing 11, a scanning mechanism 13 including a light source for illuminating the document to be scanned, a pulley and cable mechanism 15 for moving the scanning mechanism across the document, an optically transparent glass 17 for holding the document to be scanned, a mirror and sensor means 21 for sensing the light patterns reflected by the document and converting patterns of sensed light into electrical signals, and a digitizing device 19, for converting the electrical signals into digital information.

In its typical operation, an optical scanner works in the following way. A document to be scanned is placed face down on the top of the optical glass 17, again referring to FIG. 1. Typically an opaque cover is placed down over the document to hold it against the glass and prevent outside light from interfering with the scanning process. The scanning mechanism 13 is propelled laterally across the underside of the optical glass by the pulley and cable mechanism 15. A light source in the scanning mechanism 13 illuminates the document as the scanning mechanism is propelled across the underside of the optical glass. A mirror in the scanning mechanism simultaneously "reads" the patterns of light reflected off the document and transmits the image to the sensors 21. The sensors 21 "sample" the transmitted light and convert the image into electronic signals to send to the digitizing device 19. The digitizing device 19 then translates and converts the electronic signals into digital information for processing by a computer processor. It will be seen that the scanning mechanism 13 and the sensors 21 may be combined into a single unit that is propelled across the face of the document. Similarly, other designs of optical scanners may exist without altering the principles by which they may be modified according to the present invention. In flat-bed scanners, for instance, the glass with the document placed on it may itself be moved horizontally across a stationary scanning mechanism, so that the scanning mechanism can scan the entire length of the document. Likewise, in a drum scanner, the optical glass is curved and rotated with respect to the scanning mechanism. It will be easily seen that such alternative designs, as well as others, may be used in conjunction with the present invention with no change in the principles involved. Methods for adapting the invention to alternative designs of scanners will be apparent to those of ordinary skill in the art, so long as the filter is placed in the line of light between the document to be scanned and the scanning mechanism. Scanners are known in the art and include, merely by way of example, a ScanJet model made by Hewlett Packard.

The function of a scanner is to digitize images, i.e. to convert images contained on a printed document (line drawing, textual document, photograph, etc.) into digital information, i.e. a series of numbers that a computer can recognize and manipulate with software to alter and reproduce the document. A photograph, for example, contains information in analog form. When a scanner digitizes a photograph or other illustration, it converts light reflected from the image—analog information—into a digital format.

In many cases, the sensing mechanism of a scanner measures the light reflected from the document by means of a photosensitive silicon chip called a "charge-coupled device" (CCD). Some scanners may use photodiodes instead of CCDs, without altering the principles involved. A typical CCD may consist of up to thousands of elements that can measure the level of light to which they're exposed, emitting a weak electrical charge that corresponds to the light's intensity. In most scanners, the photosensitive elements are arranged in a single line. Each spot in which the CCD detects the light intensity is called a "sample point". The number of photosensitive elements in the CCD will determine the resolution of images that are scanned, e.g. 100 sample points per inch will yield a resolution of 100 dpi (dots-per-inch). An image scanned at a high resolution will have greater detail than one scanned at a lower resolution because the scanner is storing information about smaller pieces of the image. Many desktop scanners currently available operate at 300 dpi, which correlates to the 300 dpi resolution of most laser printers. 300 dpi has been found to be sufficient for most scanning purposes.

The elements of the sensing device each generate an electrical signal indicating the presence of white or black at the corresponding sample point. As the sensing device scans the document page, it generates an array of electrical signals corresponding to the two-dimensional image on the document. These electrical signals are sent to the digitizing device, which converts them to digital form. The digital data is in turn transferred to a computer processor. The resulting digital array corresponding to the image on the document is known as a bit.-map or raster image. The computer software can then process the digital information to manipulate the image, to produce graphic images through various output means, or to recognize the alpha-numeric characters to produce a computerized copy of the document.

It will be seen that the present invention may be used in any device which scans graphic images for conversion into digital information, for instance a fax machine, or any device which relies on reflection of light from a graphic image for reproduction, such as a photocopy machine.

Improving a Scanned Image

The quality of the scanned image depends on many factors: e.g., resolution of the scanner, processing by the software, etc. The most important factor, however, is the quality of the original image. The quality of the image sensed by the scanner in turn depends on several factors. Among these are:

(1) the quality of the document itself: extraneous marks or lack of detail in the original will normally be picked up by the scanner and reproduced in the final image; poor contrast will result in a choppy image or one with splotchy areas and deficiency of detail;

(2) the amount of reflected or refracted light which is sensed as coming from areas other than the area of the document intended to be sensed: for instance, excess light reflected from the optical glass or from light areas of the image can drown out the actual image, and light reflected from image outside of the area to be read can be sensed as a "ghost" image or extraneous image that will show up on the final image.

The Problem of Poor Contrast

Contrast has been defined as the differentiation between character and background in an image, i.e. as the "readability" of the image. An image with good contrast will be sharp, clear, with very white whites, very black blacks, and a full range of grays between the white and black. A poor contrast image, on the other hand, may be gray and muted, with dark "whites", light "blacks", and thus with lessened differentiation between black image and white background. The detrimental effect of poor contrast on scanning quality is generally known.

In the book, Optical Page Reading Devices, by Robert A. Wilson ["*Optical Reading Machines*"], the author explains the effect of contrast on scanning quality: "*Illumination.* Lighting of the viewing area is required, and relative contrast between character and background is an important element, as is true in all systems. How susceptible the retinal array method is to the effects of glare from the glossy paper and ink depend chiefly upon two factors, the sensitivity of the cells and the stage at which digitizing (that is, the conversion of voltage signals into black or white sensings) takes place. If the cells are sensitive enough, the slight differences in color between reflections from the black and white surfaces may provide sufficient contrast. More importantly, if the digitizing process takes place immediately after viewing, the lack of contrast in the signal outputs of the cells is likely to cause the entire area to be sensed as white, thus providing no data to the recognition circuits. On the other hand, in reading machines where digitizing is postponed, or where the recognition circuits operate directly on the amplified and "cleaned up" analog sensing received from the cells, there is a much greater probability of there being sufficient differences among the voltages to allow identification to be made."

Contrast may be heightened in one of at least two ways: First, contrast is enhanced by reducing the amount of reflected light (glare). By filtering out excessive light, detailed images become sharper and clearer. There is less chance of a black image being sensed as white, due to the data being washed out by the excess reflected light. Second, contrast may be heightened by filtering out a selected band of wavelengths of color. A yellow filter is especially useful to enhance dark images by making them appear "blacker", and to bring out more detail in lighter images.

Much in the same way, using filters to increase contrast can also enhance a scanned image. This is especially true in black and white image reproduction. Lack of contrast can cause a lack of image or an inaccurate image to be recorded. Using colored screens to cut down on the amount of reflected light so that the scanner mechanism records a more concise and accurate image. Fine lines and type are crisper and easier to read. It has been observed that yellow and amber colored screens produce the best effect. These colors are used as filters to intensify detail and reduce "glare" in black and white photography. The screens work in much the same manner in the field of optical scanners.

The Problem of Reflected or Refracted Light

In addition to the problem of low contrast produced by excessive light, scanning quality is also reduced by excess light which is reflected from areas of the image other than the area intended to be sensed, but read as coming from the area intended to be sensed. The result can be either white images being erroneously read as black (ghost images), or black images erroneously read as white (drowning out). The result appears as "scratchy" or "choppy" lines and text in the final image.

Reflected light can "bounce" between and through the different surfaces of the scanner, at any level. The intense white light projected by the scanning mechanism travels through the scanner's optical glass, through the document, and then reflects off the bright white cover typically located underneath the scanner's top lid. Some of this light escapes out of the sides of the top cover. Some of the light, however, may be read by the scanner as an erroneous and nonexistent part of the original image.

Figure 2:
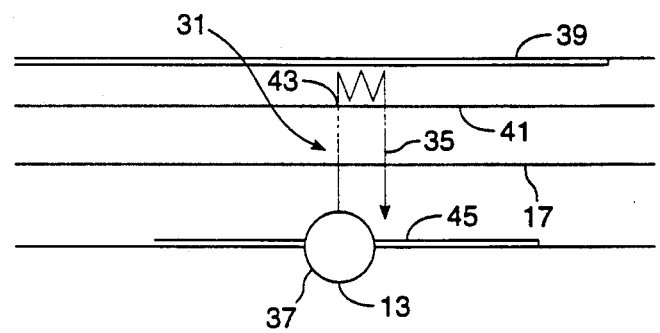
FIG. 2 is a schematic crossview of an optical scanner without a filter screen, showing the patterns of reflected and refracted light which interfere with high quality scanning.

FIG. 2 represents a crossview of an optical scanner with no filter screen, and shows the reflection and "bouncing" of light between the document, lid and optical glass which results in inaccurate images being picked up by the scanner. Light 31 from the scanning mechanism light source 37 emanates toward the portion 43 of the document 41 intended to be read by the scanning mechanism. A portion of the light penetrates through the document 41, reflects off the lid 39, and bounces between the lid 39 and the document 41 or the optical glass 17, and eventually returns to the scanning mechanism at a point 45 not corresponding to the point intended to be read by the scanning mechanism.

If the refracted light is reflecting off of part of the imprinted image, the scanning mechanism is sensitive enough to read this light as a "ghost" image, recording it as excess black area. On the other hand, if the refracted light is reflecting off a white area, the scanning mechanism reads it as excess white and literally "drowns out" the actual image. A combination of both effects causes the image to appear "scratchy" or "choppy".

In addition, reflected light may be refracted, or bent, by the optical glass, as it returns from the document to the scanning mechanism. The refracted light will contact the scanning mechanism at a point not corresponding to the point that the light reflected from, i.e. the point intended to be scanned by the scanning mechanism. The result will be the same as in the case of "bouncing" reflected light—i.e., "drowning out" or "ghost" images.

Introduction of a colored filter between the document and the light source/scanning mechanism, as contemplated in the present invention, will reduce the amount of reflected and/or refracted light reaching the scanning mechanism, thereby also reducing the amount of excess light from reflection or refraction, so that the scanner mechanism records a more concise and accurate image. Fine lines and type are crisper and easier to read; the resulting images are less scratchy and less choppy. Images, drawings, and photographs will reproduce more accurately.

Figure 3:
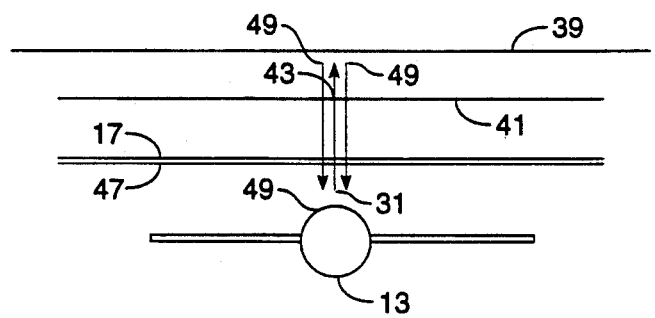
FIG. 3 is a schematic crossview of an optical scanner with a screen installed, showing the reduction in reflected and refracted light resulting in improved quality scanning.

Filter screens can be installed easily in an optical scanner to improve image quality. Permanent installation has been found to be advantageous, to continuously produce a better quality image. FIG. 3 represents a crossview of an optical scanner with a filter screen installed according to the present invention. This figure shows the reduction of reflected light and "bouncing" of light between the document, lid and optical glass. Light 31 emanates from the light source/scanning mechanism 13, passes through filter 47, and contacts the portion 43 of the document 41 intended to be read by the scanning mechanism. A portion of the light penetrates through the document 41, as before, and reflects off the lid 39. The reason for the substantially improved image production using a filter screen is not well understood. Without wishing to be bound by an particular mode of operation, one possible explanation is that because of the reduced amount of light reaching the document and the lid and reflected back, most of the light returns to the scanning mechanism at the proper point 49 corresponding to the point intended to be read by the scanning mechanism. The filter would reduce or eliminate the stray light read by the scanning mechanism, and thus reduce "ghost" images and "drowning out" of the actual image, and thus the "scratchy" or "choppy" effect caused when no filter is used.

The invention herein provides for an optical scanner filter screen that comprises a colored, preferentially a yellow or amber, screen. The invention also provides in a preferred embodiment for a filter screen comprising a colored film adhered to the under-side of the scanner's optical glass, the side of the optical glass closest to the scanning mechanism and opposite the side of the glass on which the document to be scanned is placed. In one embodiment, the optical scanner filter screen is an adhesive-backed yellow or amber mylar film adhered to the under-side of the optical glass of the optical scanner, between the document and the scanning mechanism. Film such as that made by Colorpak under the trade name "Buttercup" Transparent Color Film, has been found to be beneficial according to one embodiment. Of course, films are merely illustrations of the method herein disclosed. For example, the light filtering materials could be incorporated directly into the optical glass, or placed on or in a separate glass plate. The filter may in addition be placed in the scanning mechanism itself, such as in proximity to the mirrors of the scanning mechanism or sensor. However, in order to have the desired effect, the filtering material must be placed in the path of light between the sensors of the scanning mechanism and the document to be scanned.

For reasons that are not completely understood, placement of the filter screen on the under-side of the optical glass results in enhanced reproduction quality. One possible explanation for the improved image quality is that it allows the scanner to read the actual surface of the document so that resolution is greatly improved. The scanning mechanism of an optical scanner is typically set to focus on the top surface of the glass. If the filter is adhered to the upper surface of the glass (i.e. the surface on which the document is placed), resolution is adversely affected. As the document is slightly higher than the focal point of the scanning mechanism, the scanning mechanism is reading the recorded as accurately. By having the filter *underneath* the glass, the scanner is reading the actual surface of the document and resolution is greatly improved. In addition, placement of the filter underneath the glass prevents the film from being scratched, and keeps the image from being distorted.

In the most preferred embodiment, the optical glass itself is colored to serve as the filter screen. By coloring the glass itself, the addition of a second layer of film is avoided. Thus there is less distortion of light, and problems of focussing are avoided. Although mylar is only a few thousandths of an inch thick, there is still distortion of light and of focus. Tiny air bubbles can also appear between the mylar and the glass that might cause further distortion. Best results are achieved by using a tinted optical glass. Yellow stained glass was tried, but produced unacceptable distortion. Yellow stained glass is typically used for decorative purposes, and has imperfections and a rougher "grain" or texture than optical glass. To make tinted optical glass, a thin coating of yellow or other color gelatin is used, such as the coatings used for eyeglasses or photographic lenses. The thickness of this layer of gelatin coating is far less than that of a mylar or other type of film filter. In the alternative, the mirrors in the scanning mechanism may be tinted, to enhance the effect of or replace the colored glass or filter.

It will be seen that a typical optical scanner may be easily modified according to the present invention, by the placement of a colored optical scanner filter screen on the optical glass of a scanner, between the document to be scanned and the scanning mechanism, preferentially between the optical glass of the scanner and the scanning mechanism, or more preferably by use of a tinted optical glass.

It will also be seen that there may be scanners which do not have an optical glass for placement of the document, as does a flat bed or drum scanner. Scanners that do not have a flat glass for adhesion of a filter screen may include, for example, hand-held or other types of scanners. These scanners may be modified according to the present invention by the placement of a colored optical scanner filter screen between the optical scanner and the document to be scanned, in such a way that the light reflected from the document and sensed by the scanning mechanism will pass through the filter screen. The method of such modifications will be apparent to those of skill in the art, and are included within the scope of the present invention.

Use in Graphics Scanners

The invention will find application in a wide variety of uses related to optical scanner applications. In one embodiment, the invention comprises use of an optical scanner filter screen in a graphics scanner, for making improved quality scanned reproductions of images in patterns of black and white (line scan), shades of gray (gray-scale scan), or half-tone (the "dithered" scan, in which black and white dots are grouped together to produce a half-tone reproduction simulating shades of gray).

Typically, the quality of a graphics scan is a function of document quality, and scanner resolution. In addition, brightness and contrast of the image can be altered using image-manipulation software. However, such programs are useful primarily on gray-scale scans. For dithered half-tone scans or line-scans, the patterns of black-and-white cannot be altered in the computer without altering the pattern of the image itself. Thus, for dithered and line scans, the quality of the final image is improved primarily by improving the quality of the original scanning process of the image. In all cases, the quality of the final image remains a function of the quality of the image sensed by the scanner.

Thus, the present invention, which improves the quality of the scan of the original image while it is being scanned, is especially useful in graphics scans, where the ability to improve the image by image-manipulation software is limited. Further, when used in conjunction with image-manipulation software, the optical scanner filter screen of the present invention will result in a further improvement of a reproduction of a scanned image.

Accordingly, the present invention contemplates an improved method of optically scanning a document comprising the steps of placing an optical filter between the document and the scanning mechanism; illuminating the document; and sensing the patterns of reflected light from the document with the scanning mechanism. Said method may be used for reproduction of line graphics or of gray scale graphics such as half-tones, photographs and sketches.

Use in Character Readers

In another embodiment, the invention contemplates use of an optical scanner filter screen in an optical character reader, for making improved quality scanned reproductions of textual documents through optical character recognition.

Optical character readers are optical scanners in which a scan of a textual document is converted into digital form, for the purpose of allowing the computer to "recognize" the characters of the original document, such that the document will be reproduced and manipulable within the computer, as if the document (the alpha-numeric characters themselves) had been typed directly into the computer using a word processing program. This makes the document manipulable, so that it may be edited, extended, or combined with other documents in the computer.

The software for optical character recognition is necessarily more complex than that for optical image scanning. For image scanning, the computer need only recognize dots or sample points of white, black, or various shades of gray. For optical character recognition, the computer must recognize hundreds of complex characters, each of whose patterns may be very similar to other characters whose meanings nevertheless differ widely from the first, and characters whose own patterns may differ from document to document (e.g. with different type styles) and yet need to be recognized as the same character.

The advantage of optical character recognition programs is that they need only recognize patterns of black and white, and not shades of gray, as do optical image programs. However, because of the sensitive nature of the character shape, all black areas need to be accurately recognized as black, and all white areas need to be accurately recognized as white. Where an area is read as neither-white-nor-black, the computer must decide whether to record the area as white, or black. A mistake in this judgment will result in a mistake in the character of the final document. This is one of the main sources of error in optical character recognition scanning.

One determinant of a correct or erroneous scan is the contrast between the image and the background, between the black character and the white paper. Thus, in order to improve the quality of the scanned document (i.e., to reduce the number of errors in character recognition), the level of contrast between the image and ground in the original scanned document should be maximized. Further, reflection and refraction of light, creating ghost images and drowning out, affect the accuracy of an optical character recognition scan, by changing the shape of the character as read by the scanner, due to washing out or ghost images.

The present invention provides a method of increasing the contrast between character image and ground in the scanned document and reducing reflected and refracted light, resulting in a concomitant reduction in character recognition error. This is accomplished by using an optical filter screen to filter light between the document and the scanning element.

Accordingly, the present invention contemplates an improved method of optically scanning a document comprising the steps of placing an optical filter between the document and the scanning mechanism; illuminating the document; sensing the patterns of reflected light from the document with the scanning mechanism; converting the patterns of light into electrical signals and then to digital information; and computationally recognizing the patterns of said characters to reproduce the document in computer-readable textual form.

EXAMPLES

Each test was made using the same set of black and white or color drawings, text, or photographs. A two-step procedure was followed to run the tests. First, scanning was done under one set of conditions without a filter. Second, the same set of conditions were repeated using the same equipment but with the filter installed. The results of both tests were compared for image quality. Additional tests were performed to determine whether software manipulation alone could improve image quality beyond that achieved using the colored filter alone.

The following equipment was used to run the tests. Scanners used included a Hewlett Packard ScanJet/4-bit model; a Hewlett Packard ScanJet/8-bit model; and a Hewlett Packard ScanJet Plus/8-bit model. These scanners are all of the "flat-bed" type. The two HP ScanJet scanners used were alike in construction, but different in the way they process information, in that the 4-bit scanner does not have the capacity to pick up as fine detail as the 8-bit scanner. The two ScanJet models use a quartz-halide lamp as a light source, which produces a brighter, whiter light, resulting in better contrast but more excess light. The ScanJet Plus uses a fluorescent lamp, which produces a "softer" light, reducing the amount of excess refracted light, but also having a bluish-green cast that reduces contrast.

Software used was *Hewlett Packard Scanning Gallery* [HPSG] (two versions) for scanning graphics, and Read Rite for scanning text. The HPSG version used with the ScanJet models had predetermined intensity settings classified as "lighter", "normal", and "darker". There was no contrast setting. The software was capable of producing halftone and gray level images as well as line art. The default setting (preset for "normal" or "average" image quality) was the normal intensity setting for line-art images. The HPSG version used with the ScanJet Plus model had variable intensity and contrast settings set up as a sliding scale of 0% through 100%, with 50% being the default setting for both.

Printers used were Hewlett Packard Laserjet II and Tandy Model 1000. Both printers had a resolution of 300 dpi. Because of the differences in the manner of printing (i.e. the Tandy 100 used a "write-black" method, while the HP Laserjet II used a "write-white" method), the HP printer was capable of producing darker blacks and cleaner, sharper type. In addition, the HP printer had a control that enables the user to adjust the amount of toner being applied to the paper.

The filter used in the tests was a yellow mylar Color-pak "Buttercup" Transparent Color film, 0.003 mil in thickness, and adhesive-backed. The film was applied to the bottom of the scanner's optical glass. It will be seen that, while a yellow 0.003 mil mylar adhesive-backed film was used in these tests, various colors, thicknesses and materials may be used as filters without deviating from the scope of the present invention.

In some cases good results were achieved where a yellow tinted glass was used in place of the mylar filter. The glass was put through a chemical dipping process, similar to that used by eyeglass companies to produce tinted sunglasses. To create the tinted glass, a transparent liquid smooth water-base yellow glass stain, Flo Lite #15505 (yellow), manufactured by Great Glass, was used. The stain was poured uniformly over a piece of clear optical glass, and then allowed to dry. This process was repeated two additional times to obtain an adequate amount of yellow color. The glass was then inserted in place of the optical glass in the scanner. Any neutral color for filtering light and/or increasing contrast would be expected to yield positive results, although yellow was the color tested.

EXAMPLE 1

Figure 4A:
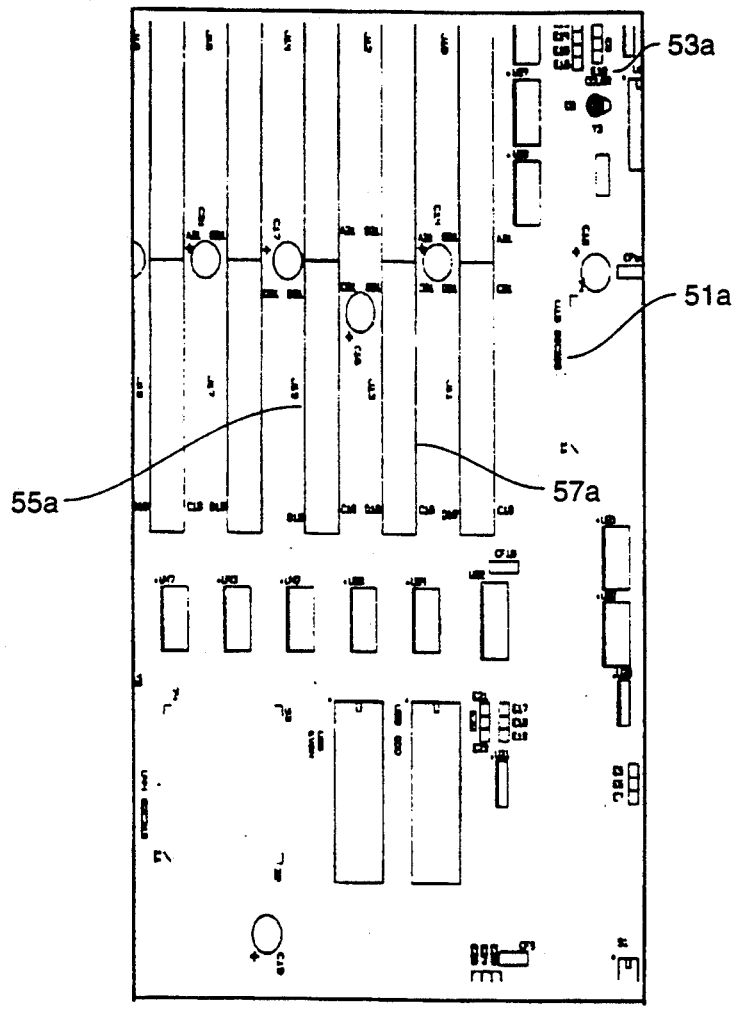
Figure 4B:
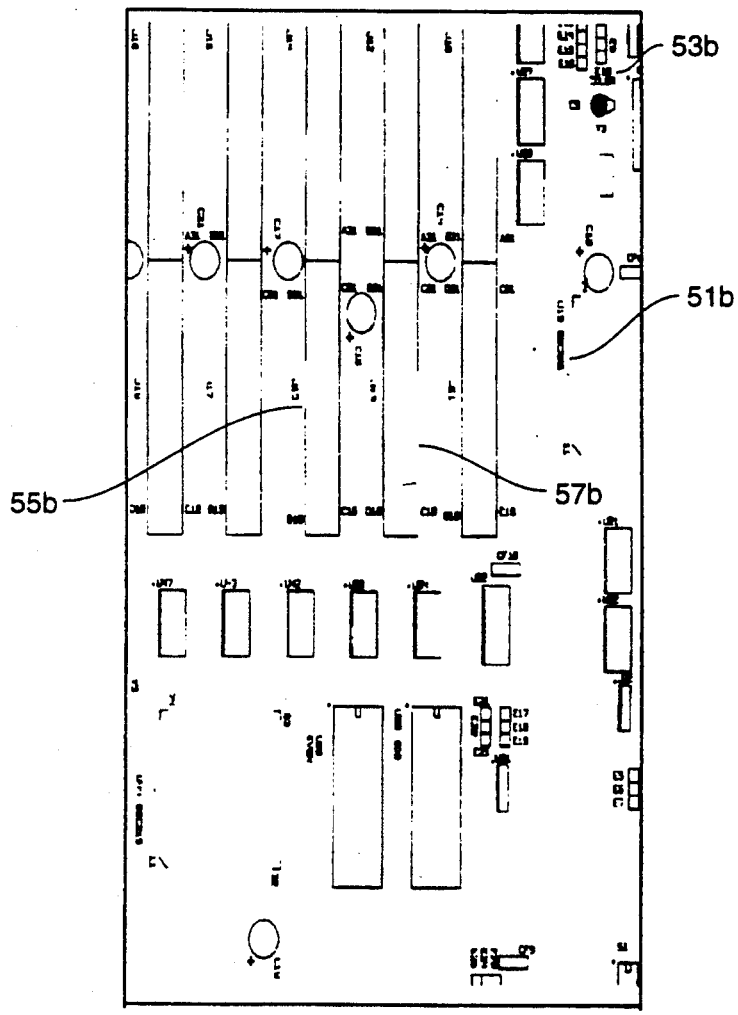

"Drowning out" and "ghost images" in line scans are illustrated in FIGS. 4a and 4b. These figures represent reproductions of scans of a line drawing with a filter screen (FIG. 4a), and without a filter screen (FIG. 4b). Ghost images are illustrated in FIG. 4 by the alphanumeric characters on the right side of the image 51a, 51b ["82C206"] and in the upper right hand corner 53a, 53b ["E19 COLOR"]. In the image made without a filter, many of the characters run together with extra black "ghost" images, 51b, 53b, obscuring the actual shape of the characters and making them indecipherable. In the image created with a filter, the ghost images are reduced so that the characters are more easily decipherable, 51a, 53a. Note especially that the "holes" in the letters appear in FIG. 4a but not in FIG. 4b. Drowning out is illustrated by the vertical lines in the center of the image, 55a, 57a, 55b, 57b. In the image created without a filter (FIG. 4b), the lines are drowned out by reflected light so that portions of the lines do not appear at all in the final image, 55b, 57b. In the image created with a filter (FIG. 4a), these lines appear as bold, essentially complete lines, 55a, 57a, more accurately representing the original image.

EXAMPLE 2

FIGS. 5a, 5b and 5c illustrate a line scan created with no filter, FIG. 5a, with an amber filter screen, FIG. 5b, and with a yellow filter screen, FIG. 5c. Areas which are thin and washed out in the image created without a filter, e.g. 61a and 63a, appear bold, dark and well defined where a filter was used, 61b, 61c, 63b, 63c. The images overall in FIGS. 5b and 5c appear bolder, darker and more readable than the image in FIG. 5a made without a filter.

EXAMPLE 3

Figure 6A:
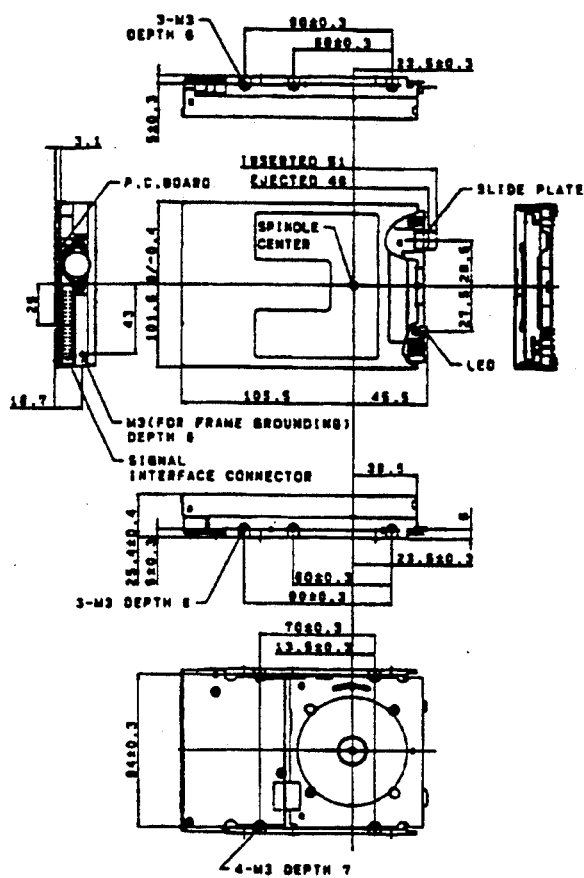
Figure 6B:
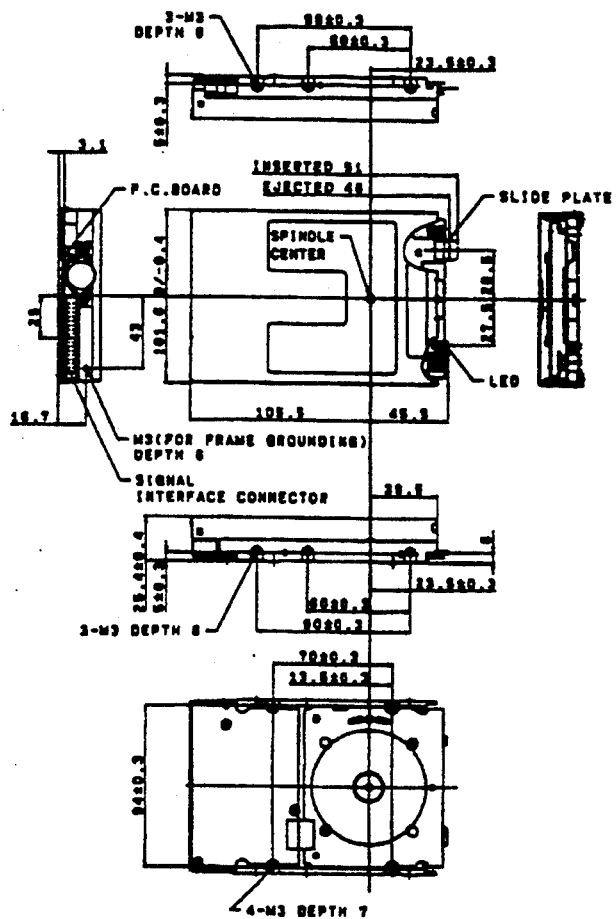

Likewise, in FIG. 6a, made without a filter, the lines are uneven and the type is not clear. FIG. 6b, made with a yellow filter, has better line definition, and type is darker and clearer.

EXAMPLE 4

In FIGS. 7a and 7b, the image made with a filter, FIG. 7b, again shows better line definition, and darker, clearer type than the image made without a filter, FIG. 7a. In addition, the type in FIG. 7a shows the "ghost" images that result from imprecise reflection of light from a document scanned without the use of a filter. See, for example, the character "C", 71a, which appears in the unfiltered image as fuzzy, "bloated" and unsymmetrical, the result of ghost images from reflected light during the scanning. The same character appears in the filtered image, 71b, as clear, crisp, sharp, with no ghost image to blur the outlines of the character. Likewise, the character "n", 73a, appears "chipped" and uneven in the unfiltered image, but full, clear and crisp in the filtered image, 73b.

EXAMPLE 5

Figure 8A:
FIGS. 8-9 show results, without and with a filter screen, of a gray-scale scan.
Figure 8B:

Concerning gray-scale scans, FIGS. 8a and 8b show a comparison of two images made without, FIG. 8b, and with, FIG. 8b, an optical scanner filter screen. FIG. 8a was made using default settings on an 8-bit HP ScanJet Plus flatbed scanner with an HP Laserjet III printer. The image appears flat and "blotchy", with little visible detail, and a reduced range of grays. FIG. 8b, on the other hand, made using the same equipment and settings, but with a filter screen, has sharper contrast, better resolution, and a better range of visible gray levels. The overall image quality is more natural-looking.

EXAMPLE 6

Figure 9A:
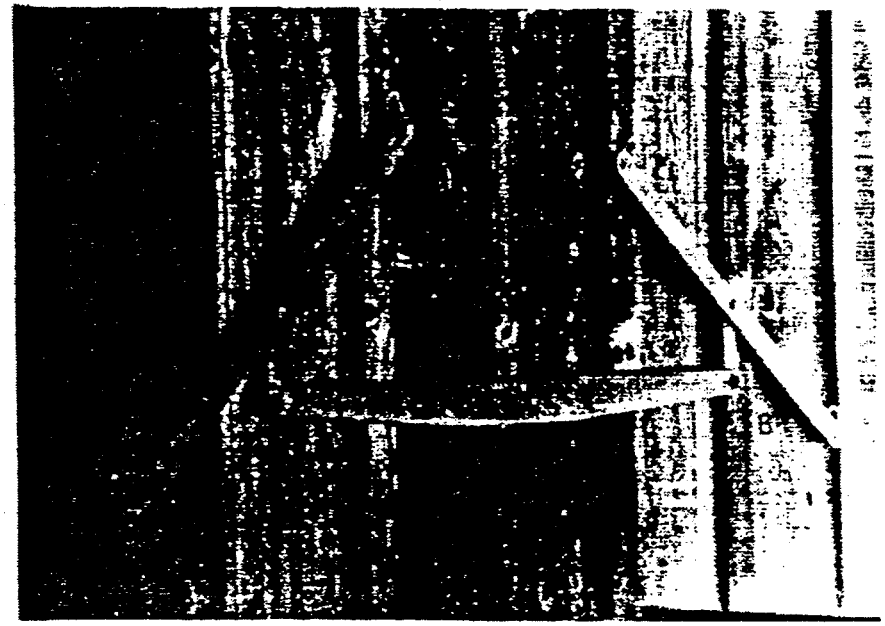
Figure 9B:
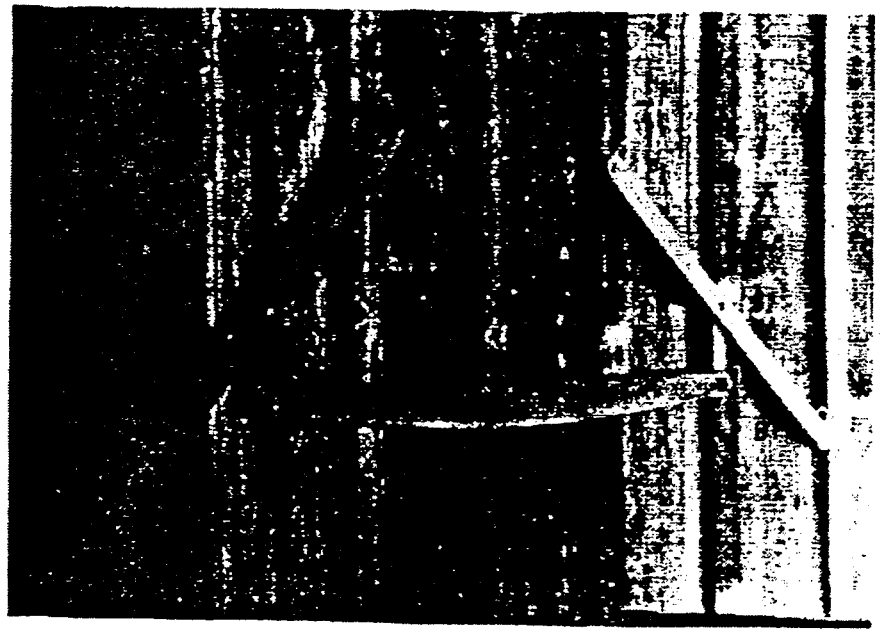

Likewise, FIG. 9 illustrates the improved shades of gray produced by scanning with a colored filter, and resulting from the improved contrast of the scanned image recorded by the optical scanner. The images were made with an HP ScanJet and Tandy 1000 printer, FIG. 9a, made without a filter, shows washed out white areas and reduced detail. In contrast, FIG. 9b, made with an optical scanner filter screen, shows blacker solid blacks, better contrast, and more detail in gray areas.

EXAMPLE 7

FIG. 10 illustrates improved character recognition by using an optical scanner filter screen during a character-recognition scan on an HP ScanJet Scanner. FIG. 10a represents the original text of the document scanned. The text reproduced without the use of a filter, FIG. 10b, shows at least 34 errors of character recognition. The same text reproduced with a filter screen, FIG. 10c, shows only about 1.0 mistakes, a reduction in errors of approximately 70%.

EXAMPLE 8

In a test using a photograph that was too dark, a combination of intensity and contrast setting were used on the HPSG/ScanJet Plus software to try to improve image quality, rather than using a yellow filter. It was necessary to try to decrease the intensity (lighten) the overall photograph, but increase the contrast (to heighten the difference between the light and dark areas of the image). The results were a shadowy, blotchy looking image with no detail at one extreme or a too-light washed-out looking image at the other.

Tests showed that the software has a very narrow margin of correctability beyond which the software has no further appreciable effect on improving the image quality. On the HPSG/ScanJet Plus software, an intensity adjustment of 15% to either side of the default setting created a dark "blotchy" image or completely faded out the image, depending on whether the intensity was increased or reduced. The contrast setting exhibited the same problem. Combining the use of both settings did not compensate for poor image quality.

Installing a yellow filter enhanced the HPSG/ScanJet Plus software's capability to make corrections by enabling a wider range of adjustment while maintaining good contrast and detail in the gray areas. The HPSG/ScanJet software used with a yellow filter produced an overall image of better quality than that produced without a filter, even where the preset intensity adjustments were used. Images produced at each setting of intensity and contrast with a filter yielded better quality images than those done at the same settings without the yellow filter.

Using a yellow filter with the quartz-halide lamp served to reduce the amount of excess refracted light and improve contrast. A yellow filter used with a fluorescent lamp improved the contrast between dark and light areas, compensating for the nature of the lamp's bluish-green cast to reduce contrast.

EXAMPLE 9

Although the HP printer produces cleaner type and finer lines than the Tandy 1000, often times the lines can still appear "choppy". Using the toner adjustment to allow more toner to be applied to the paper helps to give the appearance of a more solid line, yet in reality it is merely thickening the line with extra toner. In the case of a finely detailed drawing or schematic diagram, necessary information is lost because the type is too thick or "muddy". Using a yellow filter manipulated the light source to produce a finer line and a more accurate recording of the actual image without the need for "masking" errors or thickening lines.

It is to be understood that the above description is intended to be illustrative and not restrictive. Many variations of the invention will become apparent to those of skill in the art upon review of this disclosure. The scope of the invention should, therefore, not be seen as limited by the above description, but instead should be determined with reference to the appended claims along with their full scope of equivalents.

What is claimed is:

1. An optical scanner for scanning a document, comprising:
   a light source;
   a scanning mechanism for sensing patterns of light form the light source reflected form the document to be scanned;
   an optically transparent glass having a surface facing the scanning mechanism;
   a yellow or amber filter screen placed between the scanning mechanism and the surface of the glass facing the scanning mechanism; and
   a processor for converting the pattern of reflected light sensed by the scanning mechanism into digital information, wherein the filter screen is a mylar film.

2. The optical scanner of claim 1 further comprising at least one mirror wherein the filter screen is placed in proximity to said at least one mirror.

3. The optical scanner of claim 1 wherein the optical scanner is an optical character reader.

* * * * *